(No Model.)
D. BEEBE.
COMBINED FAUCET ATTACHMENT, BUNG, AND BUSH.
No. 495,718. Patented Apr. 18, 1893.
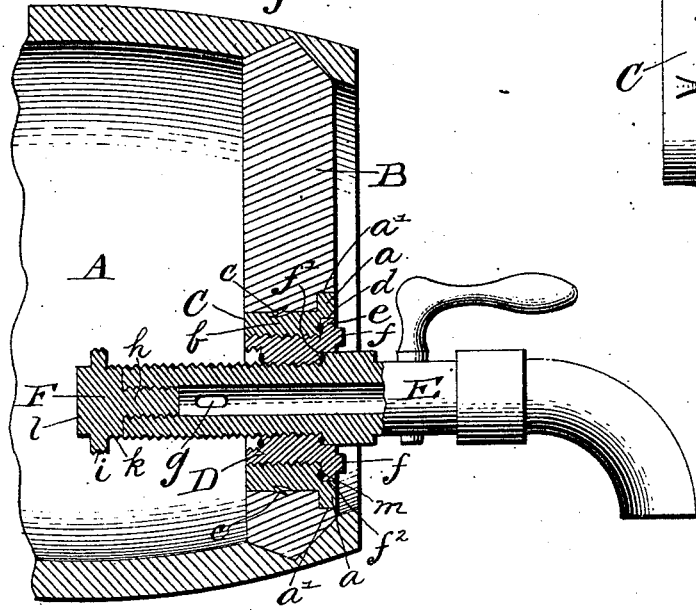
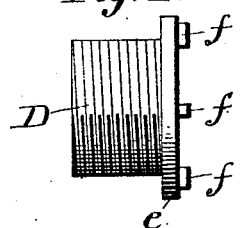
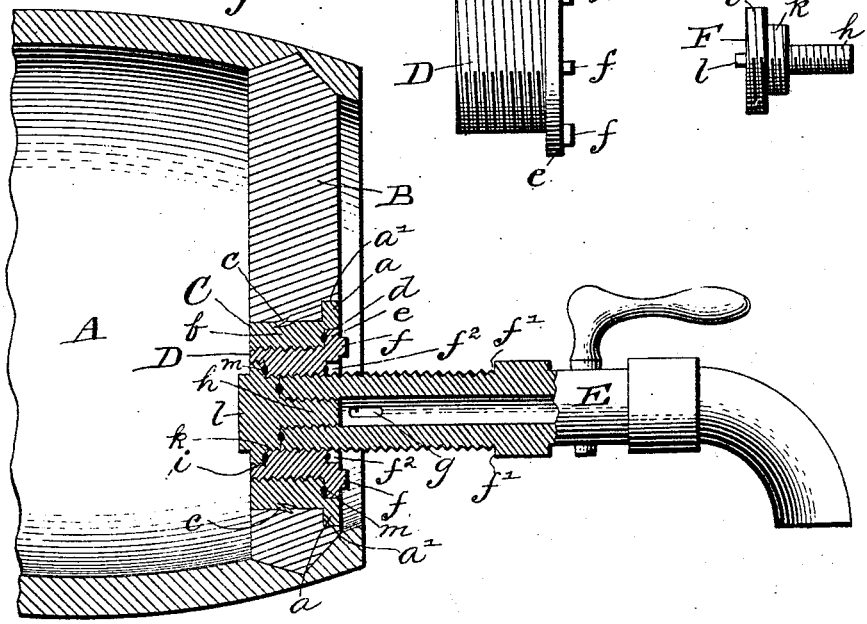
Witnesses
R. F. Beck.
W. H. Doolittle
Inventor
Dillon Beebe
by Blackwood Br
Attorneys

UNITED STATES PATENT OFFICE.

DILLON BEEBE, OF NEWARK, NEW JERSEY, ASSIGNOR TO DILLON BEEBE, JR., OF SAME PLACE.

COMBINED FAUCET ATTACHMENT, BUNG, AND BUSH.

SPECIFICATION forming part of Letters Patent No. 495,718, dated April 18, 1893.

Application filed May 9, 1892. Serial No. 432,258. (No model.)

*To all whom it may concern:*

Be it known that I, DILLON BEEBE, a citizen of the United States, residing at Newark, in the county of Essex and State of New Jersey, have invented a certain new and useful Improvement in a Combined Faucet Attachment, Bung, and Bush; and I do hereby declare the following to be a full, clear, and exact description of the invention, such as will enable others skilled in the art to which it appertains to make and use the same.

My invention relates to an improvement in a combined metallic faucet attachment, bung and bush to be used in barrels or casks containing liquids, and has for its object to provide a faucet attachment, bung and bush which is durable and strong, simple and inexpensive in construction, and effective in operation.

The invention consists in the details of construction as more fully hereinafter described and claimed. It is illustrated in the accompanying drawings in which—

Figure 1— is a longitudinal sectional view of a barrel showing my improved faucet attachment, bung and bush also in section, the faucet being screwed in and thereby opened so that the liquid can flow into the same from the barrel. Fig. 2, is a similar view showing the faucet closed; Fig. 3— a detail view of the bushing; Fig. 4— a detail of sleeve and Fig. 5— a detail of the plug which screws into the inner end of the faucet.

In the drawings A represents a barrel, and B the head thereof, C the bushing which is driven or forced into a suitable hole in the same and having on its outer portion a flange $a$ which fits into a corresponding recess $a'$ in the head of the barrel. The exterior circumference of the body $b$ of the bushing is provided with spring barbs $c$ which when the bushing is driven into the head of the barrel securely hold the same against withdrawal. The inner circumference of the bushing is screw-threaded except at its outer end where an annular groove $d$ is formed.

D is a sleeve screw-threaded on its outer circumference, for the purpose of engaging the screw-threads on the inner circumference of the bushing C. The said sleeve is provided with a flange $e$, on its outer end which is seated in the groove $d$, of the bushing, and thus it will be seen that the outer and inner faces of the sleeve and bushing are flush with each other and the head of the barrel.

$f$, are lugs projecting from the outer face of the sleeve for the purpose of furnishing means for grasping and unscrewing the same when its removal is desired for the purpose of flushing the barrel.

E is a faucet which is exteriorly and interiorly screw-threaded on its inner end and provided with inlet hole or aperture $g$, to permit the liquid to flow through the same from the barrel into the faucet.

$f'$ is an annular flange adapted to fit into an annular recess $f^2$ in the sleeve D. The screw-threads on the exterior surface of the faucet engage with the interior screw-threads of the sleeve D.

F is a plug having a screw-threaded shank $h$ projecting outwardly therefrom to engage the screw threads on the interior of the faucet E.

$i, k$, are screw-threaded shoulders on the said plug F which engage the screw-threads on the interior of the sleeve.

$l$, is a projection on the inner surface of the head of the plug F to afford a grasping surface so that the plug can be readily removed.

$m$ are circular packing rings made of rubber or other suitable material placed between the abutting surfaces of the bushing, sleeve, faucet and plug to insure perfect air and water tight joints.

The operation is as follows:—The bushing C is driven into the barrel, the plug inserted into the sleeve, the sleeve inserted into the bushing and the faucet inserted into the sleeve and screwed entirely up on the shank of the plug F. Then the faucet is screwed into the barrel until the annular shoulder $f'$, seats in the slot $f^2$, in the sleeve and thus communication is established with the contents of the barrel through the inlet hole $g$. When it is desired to remove the faucet from the barrel it is only necessary to unscrew the sleeve from the bush. To discontinue the flow of liquid into the faucet it is screwed outwardly until the inlet hole *g* is closed by passing into or beyond the sleeve.

Having thus described my invention, what I claim is—

1. In an apparatus for drawing liquids, the combination of a faucet provided with an inlet hole and an annular shoulder, and having its inner end exteriorly and interiorly screw-threaded, a plug having a screw-threaded shank and screw-threaded shoulders and a projection on its inner face, a sleeve provided on its interior at each end with an annular groove and screw-threads between said grooves, and on its exterior with screw threads and a flange provided with lugs, with a bushing provided on its interior with screw-threads and an annular groove in the outer end thereof, and on its exterior with spring barbs and an annular shoulder, substantially as described.

2. The combination of the bushing C, having its exterior circumference provided with an annular flange *a*, and bar terior with screw-threads an cess or groove *d*, with the sle with an annular flange *e*, lu threads on its outer surface of engaging the screw-thread of bushing C, and its inner mi vided with screw-threads, an cess at each end of said scre cet E, having exterior and threads on its inner ends and plug with screw-threaded sh to engage the screw-thread o the faucet, and screw-thread *k*, to engage the screw-thread D, and a projection *l*, on th plug, substantially as describ In testimony whereof I affix presence of two witnesses.

DILI

Witnesses:
R. F. HECK,
W. H. DOOLITTLE.